E. SCHNEIDER.
APPARATUS FOR LUBRICATING THE DRIVING PARTS OF ENGINES.
APPLICATION FILED JUNE 16, 1919.
1,354,852.
Patented Oct. 5, 1920.
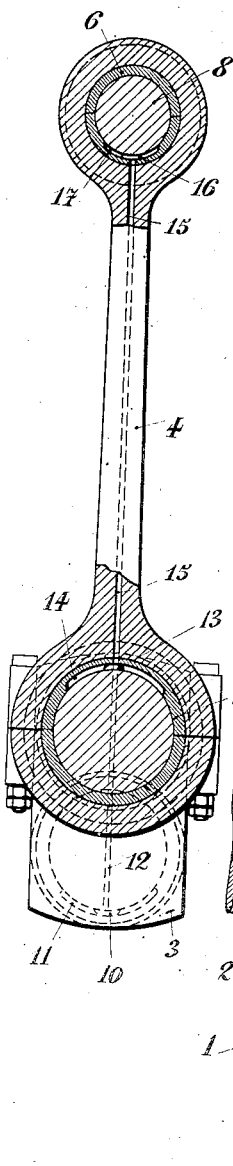
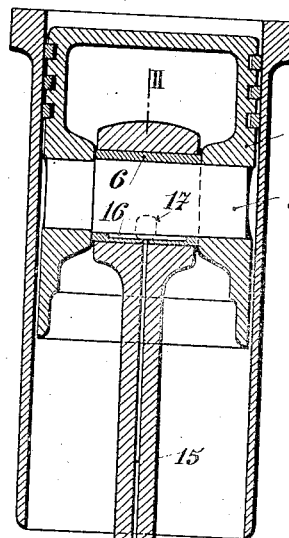
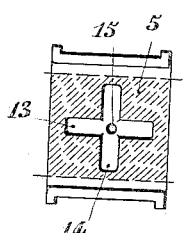
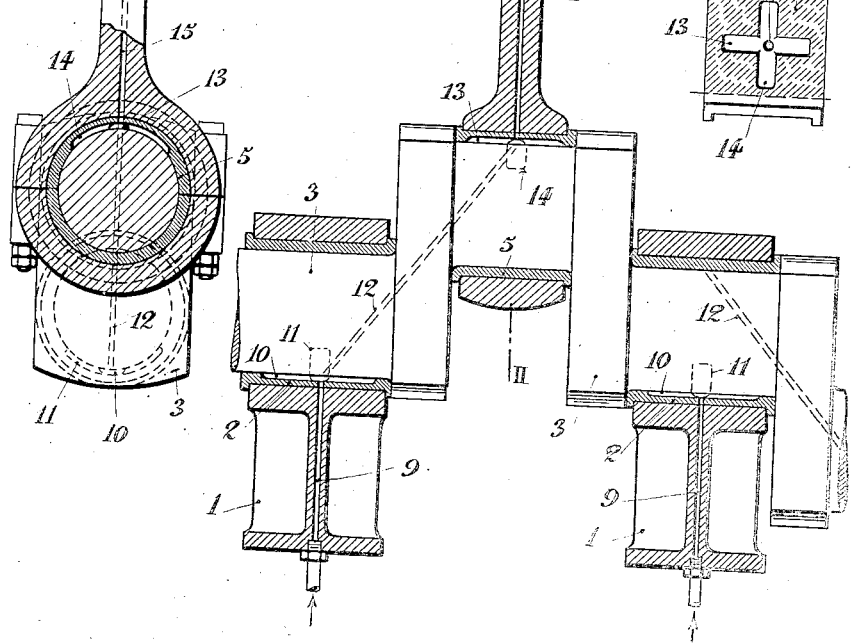
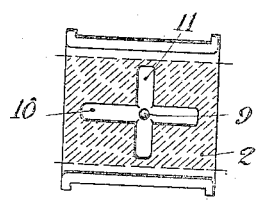

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR LUBRICATING THE DRIVING PARTS OF ENGINES.

1,354,852.  Specification of Letters Patent.  Patented Oct. 5, 1920.

Application filed June 16, 1919. Serial No. 304,659.

*To all whom it may concern:*

Be it known that I, EUGÈNE SCHNEIDER, a citizen of the Republic of France, residing at 42 Rue d'Anjou, Paris, France, have invented a new and useful Improved Apparatus for Lubricating the Driving Parts of Engines, which invention is fully set forth in the following specification.

For the purpose of effecting the forced lubrication of the bearings of the engine shaft and the joints of the driving connecting rods in vertical engines, it has been customary to employ the means consisting in conveying the lubricant under pressure to the underneath portion of the step of the engine bearing in annular grooves extending over the entire interior circumference of the steps, whence after having lubricated the latter, the lubricant passes to the bearings of the heads or large ends of the driving connecting rods through passages formed in the engine shaft; then after having lubricated these connecting rod bearings the lubricant enters a channel formed in the shank of the connecting rod on its way to the bearing in the foot or small end of the connecting rod.

However, with this method as carried out at present more particularly in Diesel engines and especially in those working on the two-stroke cycle, where the high pressures act always downwardly upon the parts, the known arrangement has the drawback that it does not maintain in a sufficiently efficacious manner the pressure of the oil between the bearing surfaces. The result of this is a defective circulation in the passages which are not kept completely full with lubricant.

It will be perceived that since the driving forces act downwardly, the oil under pressure admitted into the annular groove will escape readily through the spaces due to the play that necessarily exists in the half-steps which do not receive the driving force, and the said lubricant will therefore pass out at the sides of said steps.

The apparatus forming the subject matter of the present invention remedies those drawbacks. With this object the transverse grooves formed in the steps of the bearings of the crank shaft, like those that are formed in the upper step of the head of the connecting rod and in the step of the foot of the connecting rod, are made to extend only over an arc that is smaller than the arc (about 120°) over which the pressure of the movable parts acts upon the said steps.

The result of this is that communication is established only periodically between the passages formed in the shaft and the aforesaid grooves, so that the lubricant remains so to speak confined in oil-tight recesses and escapes therefrom only at the desired times and solely through the proper passages.

In the accompanying drawings:

Figure 1 is a longitudinal section of an engine set to which the improved apparatus is applied.

Fig. 2 is a partial section on the line II—II of Fig. 1.

Fig. 3 is a plan of a step of the engine shaft bearing.

Fig. 4 is a plan of the upper step of the driving connecting rod.

1 and 1 are the engine shaft bearings; 2, 2 are their steps; 3 is the engine shaft; 4 is the driving connecting rod; 5 is its head step; 6 its foot step; 7 is the driving piston; and 8 is the driving piston pin.

The lubricating oil enters under pressure through the orifices 9, 9, provided in the lower part of the engine shaft bearings.

The oil fills the lubricating grooves 10, 10, whence it can pass on to the bearing surfaces, being drawn slightly by the rotation of the shaft; it also fills the transverse grooves 11, 11, which extend over an arc of about 105 to 100° toward the center of the steps.

The pressure of the shaft upon the step acts over an angle of about 120° (the part shown hatched on the steps in Fig. 3), so that the oil confined in the grooves 11 is unable to escape between the bearing surfaces nor consequently can it escape around the steps.

Right opposite the grooves 11, 11 there opens one of the ends of a passage 12, 12 which extends in a diametral plane through the shaft and terminates at its opposite end at the center of the crank pin.

The upper step of the head of the connecting rod is constructed like the steps of the engine shaft bearings. It comprises a longitudinal groove 13 for effecting its own lubrication, and a transverse groove 14 extending through an angle of about 105° over the middle of the said step.

Into this groove 14 there opens the passage 15 formed in the shank of the connecting rod for the purpose of conveying the oil under pressure to the step in the foot of the connecting rod, which latter step comprises likewise grooves 16 and 17 similar to the grooves in the other steps.

It is to be understood that at the moment when the passages 12 in the engine shaft come opposite the partial transverse grooves 11, 11 in the steps of the engine shaft bearings, the oil under pressure will enter said passages and will pass into the grooves 13 and 14 of the step in the head of the connecting rod and thereby lubricate said step.

During this period, since the passage 15 in the connecting rod shank 4 opens into the partial transverse groove 14 which is full of oil under pressure, this oil will enter the said passage and will rise as far as the step of the foot of the connecting rod and lubricate said step by flowing into the grooves 16 and 17.

When, during the rotation, the passages 12, 12 of the engine shaft cease to be opposite the transverse grooves 11, 11 in the steps of the engine shaft bearings, the said passages will no longer open into the groove 14 in the step of the connecting rod head.

In these circumstances the flow of the oil ceases; but the oil that is confined between the bearing surfaces of the steps and of the engine shaft, and of the joints of the connecting rod, cannot escape and will effect the lubrication until a sufficient supply of oil is admitted when the passages 12 come again opposite the transverse grooves.

The flow of the oil takes place therefore in a periodic manner and without any possibility of escape.

What I claim is:—

In a system for lubricating shaft and piston rod bearings for vertical engines, the combination of a crank shaft having an oiling duct the opposite ends of which open on the working-pressure sides of the crank-shaft journal and the crank-shaft wrist-pin, bearings for said shaft journals each having cross-grooves for receiving oil under pressure located on the pressure side of the bearings and adapted to register with said oil duct during its passage over an angular displacement of about 105–110°, and a tubular piston-rod having steps in which are formed cross-grooves open to each other through said piston-rod and to said oil duct during said angular displacement.

In testimony whereof I have signed this specification.

EUGÈNE SCHNEIDER.

Witnesses:
ANDRÉ MOSTICKER,
CHAS. P. PRESSLY.